United States Patent [19]

Streib

[11] 4,258,822
[45] Mar. 31, 1981

[54] MUFFLER PLUG FOR GAS TURBINE POWER PLANT

[75] Inventor: Richard A. Streib, Ellington, Conn.

[73] Assignee: United Technologies Corporation, Hartford, Conn.

[21] Appl. No.: 61,340

[22] Filed: Jul. 27, 1979

[51] Int. Cl.³ ............ F01N 1/00; F02K 1/00; G10K 11/04
[52] U.S. Cl. .................................. 181/213; 60/262
[58] Field of Search ........................ 181/213–222, 181/224; 60/224, 262

[56] References Cited

U.S. PATENT DOCUMENTS

| 4,051,671 | 10/1977 | Brewer | 60/262 |
| 4,064,961 | 12/1977 | Tseo | 181/213 |
| 4,135,363 | 1/1979 | Packman | 181/220 |
| 4,137,992 | 2/1979 | Herman | 181/213 |

FOREIGN PATENT DOCUMENTS 935119  8/1963  United Kingdom ............ 181/213

Primary Examiner—George H. Miller, Jr.
Assistant Examiner—Benjamin R. Fuller
Attorney, Agent, or Firm—Norman Friedland

[57] ABSTRACT

The slant of tubes utilized for sound suppression in the exhaust plug in the tail pipe of a jet engine is tailored to avoid or minimize flow velocities into and out of the plug.

1 Claim, 2 Drawing Figures

MUFFLER PLUG FOR GAS TURBINE POWER PLANT

BACKGROUND OF THE INVENTION

This invention relates to sound suppression of a gas turbine engine exhaust and particularly to means for minimizing pressure losses occasioned in the muffler tail pipe exhaust plug.

As is shown in U.S. Patent Application Ser. No. 003,434 filed on Jan. 12, 1979 by D. E. Cicon and assigned to the same assignee as this patent application, an acoustic plug carries a plurality of slots communicating the grazing flow with the volume internal of the plug. To minimize interaction of flow into and out of adjacent slots internal partitions are judiciously located therein.

This invention serves to eliminate these partitions by discretely mounting the openings in the plug such that pressure balance is effectuated and flow velocity into and out of the plug through the openings are eliminated or minimized.

SUMMARY OF THE INVENTION

A feature of this invention is to minimize or eliminate circulation between the tubes or openings in a muffler plug of a gas turbine engine exhaust by proper location of the tube slant angle relative to the flow stream.

Other features and advantages will be apparent from the specification and claims and from the accompanying drawings which illustrate an embodiment of the invention.

DESCRIPTION OF THE PREFERRED EMBODIMENT

Figure 1:
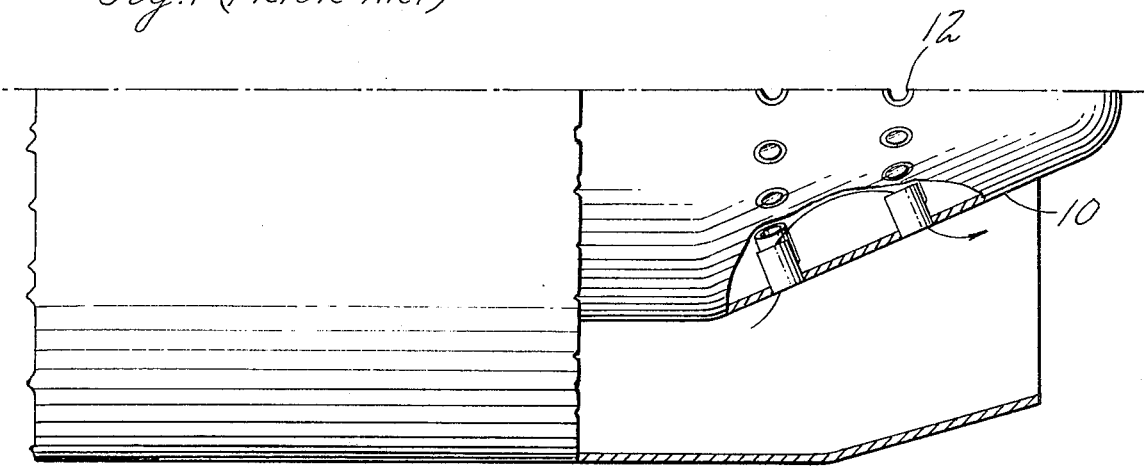
FIG. 1 is a view partly in schematic and partly in section illustrating the prior art.

As is exemplified by the prior art configuration of a muffler plug generally illustrated by reference numeral 10 in FIG. 1, the tubes 12 are open ended communicating the grazing flow on the outer surface with the volume within the plug. Conventionally, these tubes are mounted perpendicular to the surface of the plug. Because the tube patterns described above are inherently exposed to axial pressure gradients, large total pressure losses can occur because of flow circulations between tubes. The conventional method of preventing circulation has been to partition or compartment between adjacent tubes. This method has both weight and structural penalties associated with it particularly since the plug is located in the hot environment of the primary stream.

Figure 2:
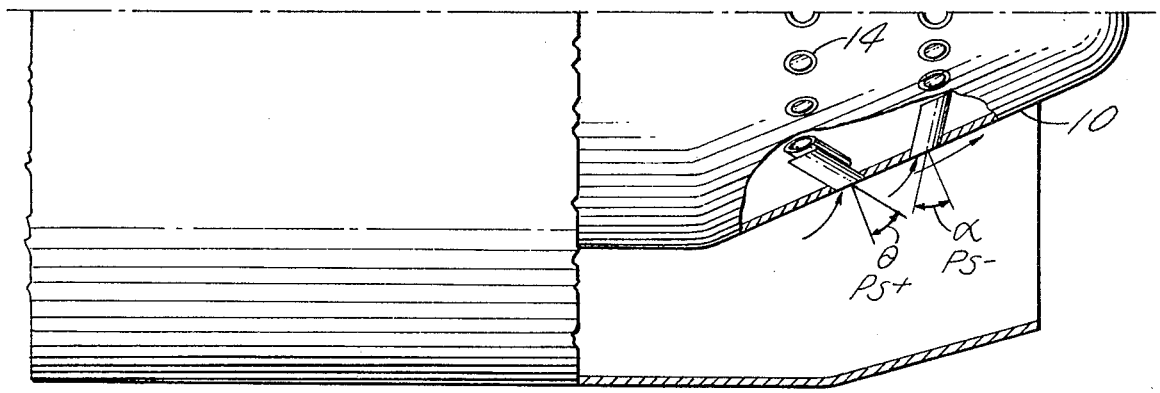
FIG. 2 is a sectional view showing the invention.

FIG. 2 shows my invention for minimizing circulation and hence total pressure loss associated with circulation, without the need for partitioning. As noted, the tubes are selectively slanted at some specified angle rather than being located perpendicular to the surface For example, the tube located upstream in the area of high free stream pressure is slanted away from the direction of the free stream flow, decreasing the flow coefficient of the tube, while the downstream tube located in an area of lower free stream pressure is slanted toward the direction of flow decreasing its flow coefficient. Through selective tailoring of tube slant angle $\theta$ and $\gamma$, pressures on the inside can be made equal preventing circulation between tubes.

It should be understood that the invention is not limited to the particular embodiments shown and described herein, but that various changes and modifications may be made without departing from the spirit and scope of this novel concept as defined by the following claims.

I claim:

1. A muffler plug disposed in the tail pipe of a turbine type power plant having a generally bullet like shaped hollow body member having its apex at the downstream end relative to the grazing flow, at least two banks of a plurality of circumferentially spaced openings in said outer circumference of said body for leading air into said hollow body and tubes in said openings disposed angularly with respect to the grazing flow, and the tubes in the adjacent banks being at angles so that the total pressure admitted internally of said hollow body from one bank counteracts the total pressure admitted from the adjacent banks so that the flow in said hollow body is substantially quiescent so that continuous flow into and out of adjacent banks is substantially eliminated.

* * * * *